(12) United States Patent
Schnase et al.

(10) Patent No.: US 10,339,114 B2
(45) Date of Patent: Jul. 2, 2019

(54) SYSTEM AND METHOD FOR PROVIDING A MODERN-ERA RETROSPECTIVE ANALYSIS FOR RESEARCH AND APPLICATIONS (MERRA) DATA ANALYTIC SERVICE

(71) Applicant: The United States of America represented by the Administrator of the National Aeronautics and Space Administration, Washington, DC (US)

(72) Inventors: John L. Schnase, Laurel, MD (US); Daniel Q. Duffy, Gambrills, MD (US); Glenn S. Tamkin, Silver Spring, MD (US); Mark McInerney, Chevy Chase, MD (US); Denis Nadeau, Baltimore, MD (US); John H. Thompson, Fairfax Station, VA (US); Scott Sinno, Atlanta, GA (US); Savannah L. Strong, Stevensville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 882 days.

(21) Appl. No.: 14/711,137

(22) Filed: May 13, 2015

(65) Prior Publication Data
US 2016/0335291 A1    Nov. 17, 2016

(51) Int. Cl.
*G06F 16/21*    (2019.01)
*G06F 16/182*    (2019.01)

(52) U.S. Cl.
CPC .......... *G06F 16/211* (2019.01); *G06F 16/182* (2019.01)

(58) Field of Classification Search
CPC ......... G06F 17/30194; G06F 17/30292; G06F 19/28; G06F 17/30241; G06F 17/30268;
(Continued)

(56) References Cited

U.S. PATENT DOCUMENTS

| | | | |
|---|---|---|---|
| 2003/0012431 A1* | 1/2003 | Irwine | G06T 9/005 382/166 |
| 2013/0014046 A1* | 1/2013 | Watts | G01W 1/00 715/772 |

(Continued)

*Primary Examiner* — James Trujillo
*Assistant Examiner* — Fatima P Mina
(74) *Attorney, Agent, or Firm* — Christopher O. Edwards; Bryan A. Geurts; Mark P. Dvorscak

(57) ABSTRACT

A system, method and computer-readable storage devices for providing an interface for an analytic service for Modern-Era Retrospective Analysis for Research and Applications (MERRA) datasets. An example system for providing the service includes a data analytics platform of an assemblage of compute and storage nodes that provide a compute-storage fabric upon which high-performance parallel operations are performed over a collection of climate data stored in a distributed file system, a sequencer that transforms the climate data, a desequencer that transforms serialized block compressed sequence files between data formats. The system includes a services library of applications that dynamically create data objects from the data as reduced final results, and a utilities library of software applications that process flat serialized block compressed sequence files. The system also includes a service interface through which a client device can access the climate data via the data analytics platform.

20 Claims, 4 Drawing Sheets

(58) Field of Classification Search
CPC .......... G06F 17/3027; G06F 17/30864; G06F 16/211; G06F 16/182; G06F 16/93
See application file for complete search history.

(56) References Cited

U.S. PATENT DOCUMENTS

2014/0298012 A1* 10/2014 Orsini ................. G06F 21/6209
713/165
2015/0046532 A1* 2/2015 Szczytowski ....... G06F 11/3086
709/204

* cited by examiner

SYSTEM AND METHOD FOR PROVIDING A MODERN-ERA RETROSPECTIVE ANALYSIS FOR RESEARCH AND APPLICATIONS (MERRA) DATA ANALYTIC SERVICE

BACKGROUND

1. Technical Field

The present disclosure relates to analytic services and more specifically to climate-specific analyses for the Modern-Era Retrospective Analysis for Research and Applications (MERRA) dataset.

2. Introduction

The Modern-Era Retrospective Analysis for Research and Applications (MERRA) is a climate reanalysis dataset of great value to society. MERRA integrates data from a variety of satellite systems with numerical models to produce a temporally and spatially consistent synthesis of climate variables that are not easily observed. MERRA provides global coverage. The MERRA dataset covers the modern era of remotely sensed data, from 1979 to the present. The breadth of MERRA variables, which include atmosphere, ocean, and land surface products, makes MERRA ideal for investigating climate variability and for use in an expanding array of applications areas, such as national disasters, civil engineering, ecological forecasting, health and air quality, water resources, and agriculture, for example.

Currently, end users, climate researchers, or members of the public have only limited access to MERRA data. Current technologies are deficient because the MERRA dataset is too large to be moved from the archives where it is stored to end users where the data can be more easily analyzed and used. What is needed is an improved approach for easier access to MERRA data for data analyses from where the data are stored before moving reduced, more usable products to the end user for further study.

DETAILED DESCRIPTION

In order to address current shortcomings in the art, a combination of technologies are disclosed herein to more effectively provide access to MERRA data and analytics as a service. A system, method and computer-readable storage devices are disclosed which provide an interface for an analytic service for MERRA datasets. An example system for providing the service includes a data analytics platform of an assemblage of compute and storage nodes that provide a compute-storage fabric upon which high-performance parallel operations are performed over a collection of climate data stored in a distributed file system, a sequencer that transforms the climate data, a desequencer that transforms serialized block compressed sequence files between data formats. The system includes a services library of applications that dynamically create data objects from the data as reduced final results, and a utilities library of software applications that process flat serialized block compressed sequence files. The system also includes a service interface through which a client device can access the climate data via the data analytics platform.

The MERRA data analytic service (MERRA/AS) described herein provides an exemplary embodiment of the concept of climate data analytics as a service. This implementation can be a component of a climate data analytics system. MERRA/AS can improve access to MERRA data. Various modifications and changes may be made to this embodiment without departing from the broader spirit and scope of the disclosure. In particular, alternative analytic methods may be used as the basis for such a service, and the approach described here can apply to a wide range of climate data sets beyond MERRA.

Figure 1:
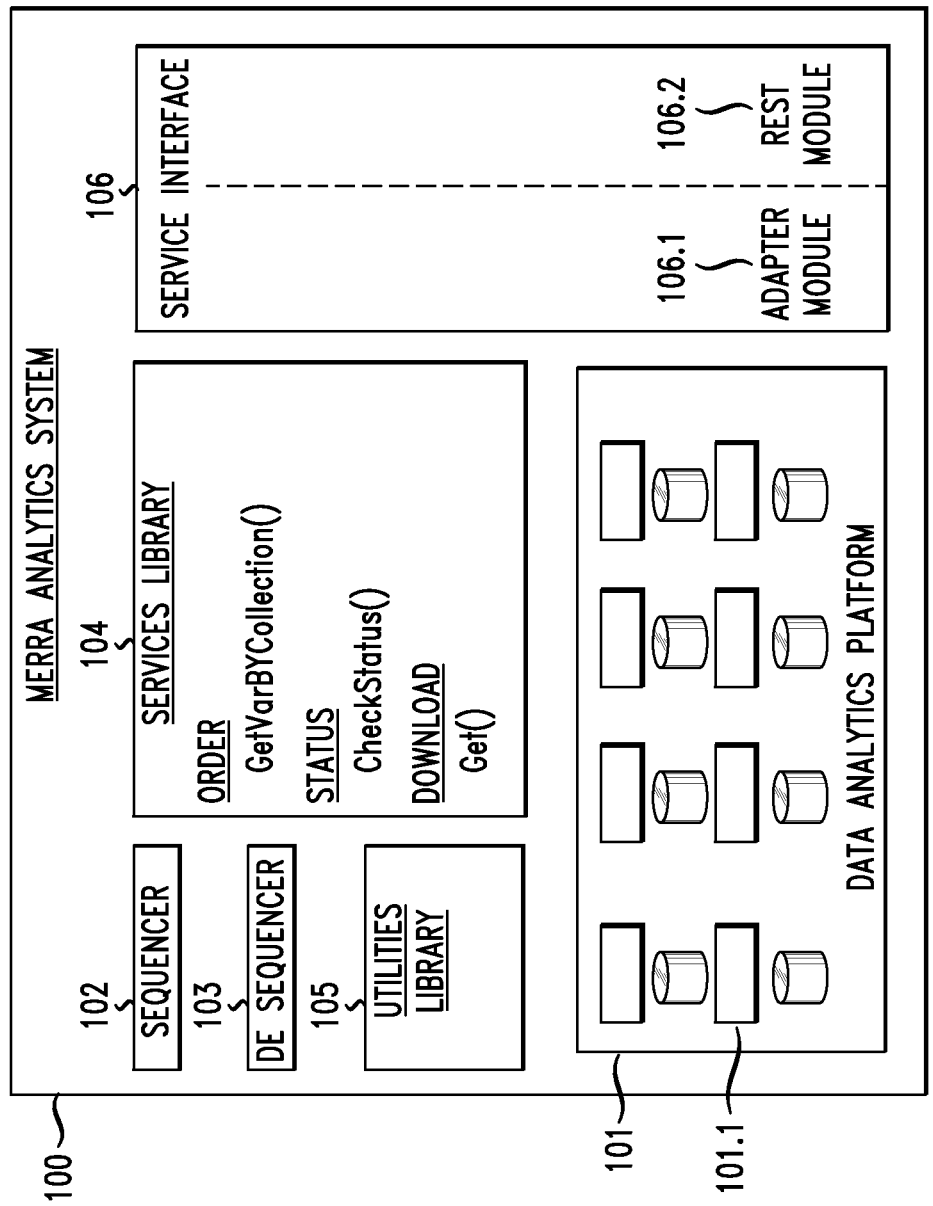
FIG. 1 is a diagram showing an example of a MERRA data analytic service.

FIG. 1 illustrates the overall organization of an example system 100 providing MERRA data analytic services. The system 100 can include a high-performance data analytics platform 101, a sequencer 102, a desequencer 103, a services library 104, a utilities library 105, MERRA source data, and a service interface 106. The high-performance data analytics platform 101 can include data 101.1 sourced from one or more data sources and one or more data storage devices. The high-performance data analytics platform provides the storage and compute capabilities required to run the service. The MERRA/AS platform can support MapReduce analytics; however, alternative configurations are possible so long as they enable high-performance, parallel computing over a parallel Hadoop filesystem and provide the software tools needed to support the MapReduce code sets that implement the capabilities of the system. One example configuration of the high-performance data analytics platform can be a 367-node Dell cluster of 576 Intel 2.6 gigahertz Sandy Bridge cores, 2304 gigabytes of random access memory, 1296 terabytes of raw storage, and having a 11.7 teraflop theoretical peak compute capacity, wherein nodes communicate through a Fourteen Data Rate Infiniband network having peak Transmission Control Protocol/Internet Protocol speeds in excess of 20 gigabits per second, and an open source Cloudera enterprise-ready distribution of the Apache Hadoop software application of a Hadoop file system and MapReduce engine, wherein Cloudera is integrated with configuration and administration tools and related open source software applications such as Hue, Oozi, Zookeeper, Hive, and Impala.

In order to execute MapReduce operations on the MERRA data, the data first need to be ingested into the Hadoop filesystem (HDFS) of the compute-storage platform. MERRA is produced by NASA's Goddard Earth Observing System Data Assimilation System Version 5 (GEOS-5). GEOS-5 output files are in HDF-EOS format, which is an extension of the Hierarchical Data Format Version 4 (HDF-4). The system can convert these source files to Network Common Data Format (NetCDF) files, because many applications use the NetCDF file format. NetCDF is a self-describing format that contains both data and metadata. The system can support new versions of the MERRA dataset as they are produced.

In an initial load step, the MERRA/AS sequencer 102 transforms MERRA NetCDF source files into the flat, serialized block compressed sequence files required by MapReduce programs and loads the sequence files into the Hadoop filesystem (HDFS). The system can create a single custom sequence file for each NetCDF file, wherein the source file's data are logically stored as <key, value> pairs within the resulting sequence file. As a result, each sequence file has a one-to-one mapping to the original NetCDF file. One benefit of this approach is that NetCDF metadata is preserved within the sequence file.

The MERRA/AS sequencer can operate on a variety of common climate data file formats. The sequence files produced by the sequencer function as Hadoop map files and can be encoded in a variety of common sequence file formats, including Bloom, Sequence, and Map formats. The sequencer 102 can partition native MERRA data files by time such that each record in the sequence file contains a composite key including a timestamp and climate variable name that is associated with a value that is the value of the named climate variable. Similarly, the sequencer 102 can partition native MERRA data files by other criteria, such as by location, by size, by type, etc., with the corresponding changes in the composite key. Depending on the variable and collection type, the variable can represent either a two- or three-dimensional quantity. The sequencer 102 can also implement a variety of functions to support the primary capabilities of the sequencer, such as data preparation and formatting.

MERRA/AS can include a complementary program, the desequencer 103, that transforms the flat, serialized block compressed MERRA sequence files stored in the HDFS back into NetCDF files and moves them out of the HDFS for consumption by a calling program. The system 100 can sequence and desequence this binary, multidimensional NetCDF data in an improved manner.

The services library 104 contains a collection of methods that implement the core capabilities of the service, such as an order method, a status method, and a download method. The system organizes these methods to contribute to the integrated analytics-archive management perspective of climate data analytics as a service. The functional capabilities of the service may correspond to the Open Archival Information System (OAIS) Reference Model data flow categories of an operational archive. An OAIS is an archive of an organization of people and systems that has accepted the responsibility to preserve information and make it available for a designated community. The term OAIS also refers to the International Standards Organization (ISO) OAIS Reference Model for an OAIS. This reference model is defined by recommendation CCSDS 650.0-B-1 of the Consultative Committee for Space Data Systems (CCSDS); this text is identical to ISO 14721:2003. The CCSDS's purview is space agencies, but the OAIS model it developed has proved useful to a wide variety of other organizations and institutions with digital archiving needs. OAIS provides a framework for the understanding and increased awareness of archival concepts needed for long-term digital information preservation and access and provides the concepts needed by non-archival organizations to be effective participants in the preservation process.

The OAIS-based capability categories used to organize a service's methods can include operations such as ingest, query, order, download, execute, and status. Ingest methods input objects into the system. Query methods retrieve metadata relating to data objects in the service. Order methods dynamically create data objects. Download methods retrieve objects from the service. The execute and status categories accommodate the dynamic nature of a climate data analytics as a service-type archive. Execute methods initiate service-definable operations that can extend the functionality of a service, and status methods check on the progress of running operations.

In the example system 100, MERRA/AS's services library 104 contains three OAIS categories of capability: order, status, and download. A single GetVariableByCollection_Operation_TimeRange_SpatialExtent_VerticalExtent order method can implement seven commonly-used operations: maximum, minimum, sum, count, average, variance, and difference operations, as well as others. Inputs to the method can include the name of a climate variable in a specified MERRA collection, the type of operation to be performed, the specification of a temporal extent and three-dimensional spatial extent, and any additional parameters needed by the operation. The output of the GetVariableByCollection_Operation_TimeRange_SpatialExtent_VerticalExtent method can include a unique session identifier for the order session that can be used to retrieve session status information and download results.

MERRA/AS's GetVariableByCollection_Operation_TimeRange_SpatialExtent_VerticalExtent method implements its operations using MapReduce, wherein mapper and reducer programs direct the parallel subsetting and execution of the operations over MERRA data stored in the analytic platform's Hadoop filesystem. The system 100 can perform subsetting and other operations in an improved manner. MERRA/AS's status and download capabilities are implemented by the service library's CheckStatus and Get methods. These methods can be used to check on the progress of a running order operation and download the computed results when the operation finishes. The functioning of MERRA/AS's services methods is supported by a collection of methods that compose a utilities library 105. In one embodiment, the services and utilities libraries are implemented as Java classes. However, a variety of alternative approaches could be used.

Finally, MERRA/AS has a service interface 106 that exposes the capabilities of the service to external users and applications. The interface 106 has two components: an adapter module 106.1 that maps an incoming service request to the appropriate method and invokes the method and a representational state transfer (REST) module 106.2 that implements a RESTful web server that external applications can access over a network. In the example embodiment, the RESTful interface 106.2 is implemented as a PHP program. The communications protocol implemented by the RESTful service can also be based on the OAIS Reference Model's data flow categories.

Figure 2:
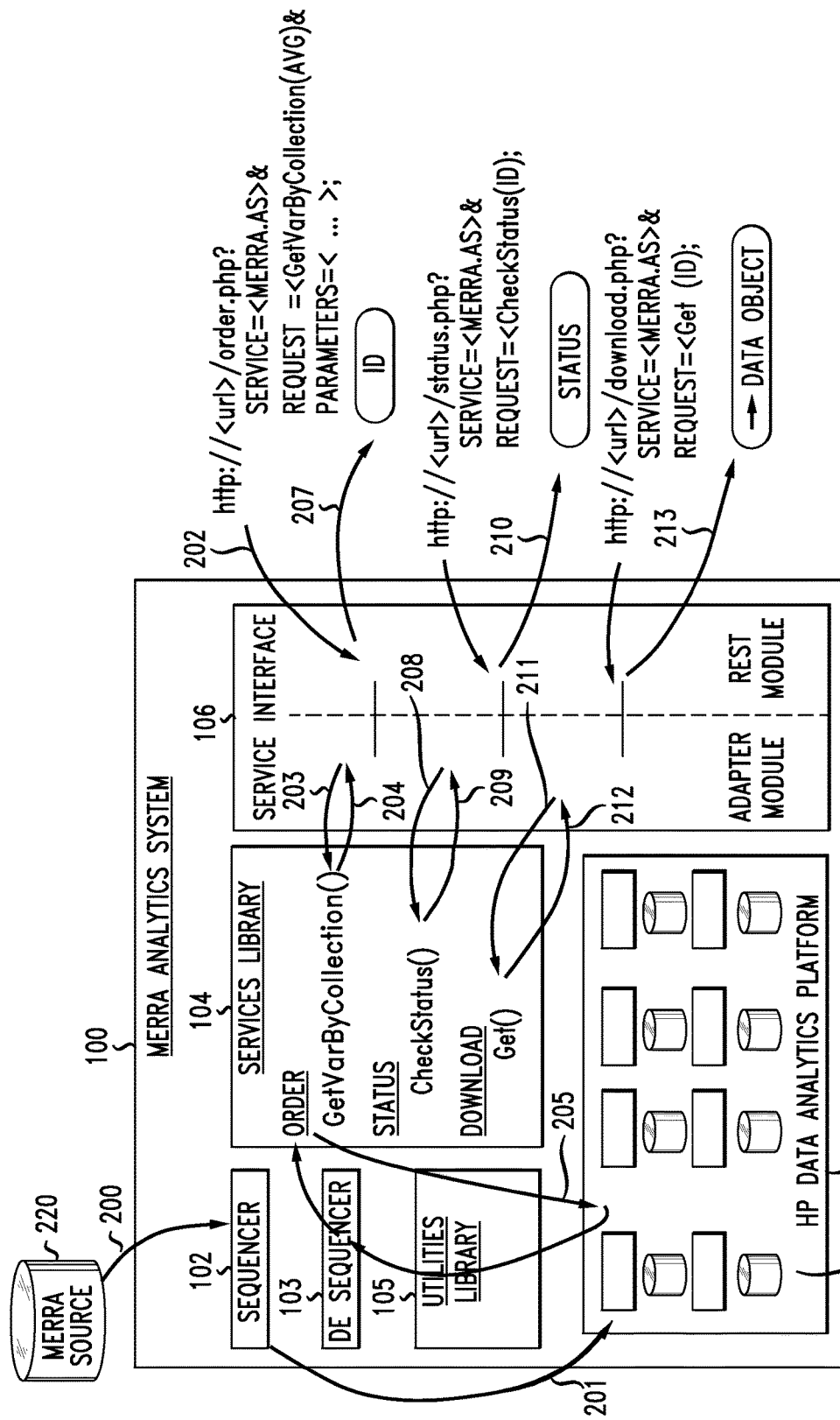
FIG. 2 is a diagram and flowchart showing an exemplary use of a MERRA data analytic service.

FIG. 2 illustrates a basic workflow of interactions among the components of the MERRA data analytics system 100. In a first step 200, MERRA source data 220 is provided as input to the sequencer 102, which transforms the source NetCDF files into MapReduce sequence files and loads 201 the sequence files into the Hadoop filesystem of the data analytics platform.

In an example request for a computed data object, a user or application would submit 202 a RESTful order service request to MERRA/AS via the system interface 106 indicating the operation to perform and parameters that further specify the request. The service interface 106 maps 203 the incoming service request to the appropriate order method, in this case the GetVariableByCollection_Operation_TimeRange_SpatialExtent_TemporalExtent method, which launches 205 the operation as a MapReduce computation on the data analytic platform 101 and returns 207 a session identifier (ID) through the interface to the calling application.

Once the order request is launched, the calling application may issue status service requests wherein the CheckStatus method is invoked 208 with the session ID to monitor the progress of the order request. The system interface 106 maps the CheckStatus request to the appropriate call to the services library 104 and receives 209 the status, which the system interface 106 passes back 210 to the calling application. When the order request is finished, the computed data object is desequenced and prepared for retrieval by the calling application as a NetCDF file. In a final step, the calling application could then submit a download service request via the system interface 106, which the interface 106 maps 211 to the services library 104. The services library 104 returns 212 the data which the system interface 106 relays 213 to the calling application.

Figure 3:
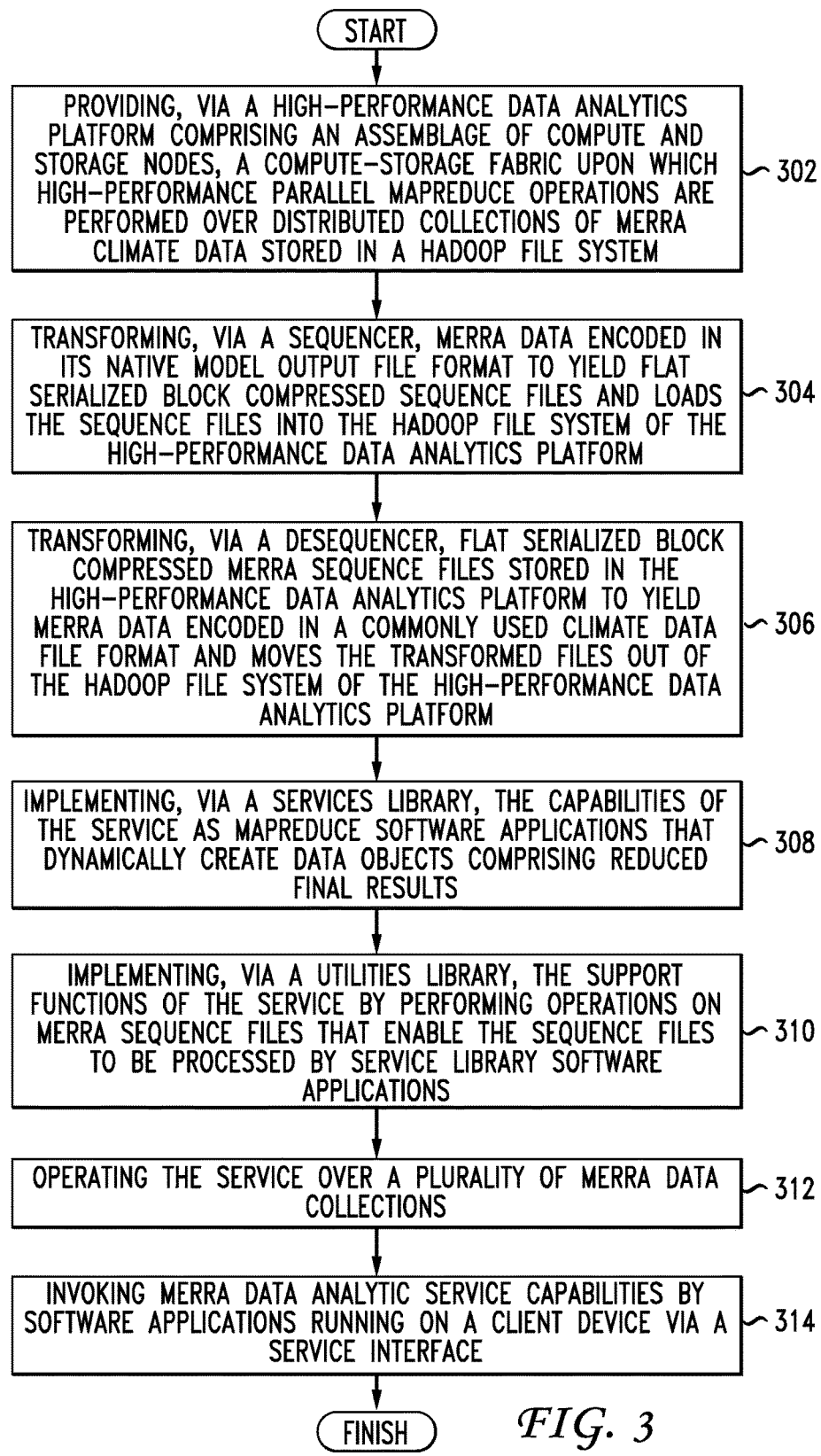
FIG. 3 illustrates an example method embodiment.

Having disclosed some basic system components and concepts, the disclosure now turns to the exemplary method embodiment shown in FIG. 3. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

A system 100 configured according to this disclosure can provide access to MERRA data via an interface. The example system includes a data analytics platform of an assemblage of compute and storage nodes that provide a compute-storage fabric upon which high-performance parallel operations are performed over a collection of climate data stored in a distributed file system (302). Example parallel operations include MapReduce operations. An example distributed file system is a Hadoop file system. Example climate data includes Modern-Era Retrospective Analysis for Research and Applications (MERRA) climate data. The climate data can be encoded in one of Network Common Data Format or Hierarchical Data Format, for example. Sequence files can be encoded in one of Bloom, Sequence, or Map file formats.

The system includes a sequencer that transforms the climate data encoded in a native model output file format to yield flat serialized block compressed sequence files and loads the flat serialized block compressed sequence files into the distributed file system (304). The sequencer can transform native model output file format files to yield sequence files as Hadoop input files. The input files can be in one of multiple formats, such as Bloom, Sequence, and Map formats. The sequencer can partition native MERRA data files by time such that each record in a sequence file contains a timestamp and a MERRA climate variable name which are a composite key of a MapReduce <key, value> pair. MERRA climate variable names can serve as values of the <key value> pair. MERRA climate variable names can include one to three or more spatial dimensions. The sequencer can perform other operations such as reading and writing sequence files, dynamically determining a file format for the sequence files at run time, providing access to a main climate variable, associated ancillary variables, and associated metadata contained in sequence files, storing additional metadata for the main climate variable in sequence files, and parsing command line arguments and configuration file settings to control the sequencer. The sequencer can operate on climate data encoded in the Network Common Data Format, Hierarchical Data Format, or virtually any other related commonly used climate data file format.

The system includes a desequencer that transforms the flat serialized block compressed sequence files from the native model output file format to a second climate data file format and moves data stored in the second climate data file format out of the distributed file system (306).

The system includes a services library including a plurality of software applications that dynamically create data objects from the data stored in the second climate data file format as reduced final results (308). The services library can provide a status operation including a CheckStatus method that checks on progress of an order request according to user-specified input parameters including a unique session identifier for the target order request. The status operation can return outputs including a unique session identifier for the status session, a one word status update of the session identified by the input session identifier, and a detailed description of a target session. The services library can provide a download operation including a Get method to download a data object that has been dynamically created by an order request according to user-specified input parameters including a unique session identifier for a target order request and an optional name for a resulting data object. The output can be the resulting data object.

The services library can be a set of Java classes which implement the capabilities of the services corresponding to the International Organization for Standards (ISO) Open Archival information System (OAIS) Reference Model data flow categories for an operational archive. Such capabilities include "ingest" capabilities to input data objects to the service, "query" capabilities that retrieve metadata relating to data objects in the service, "order" capabilities that dynamically creates data objects in the service, "download" capabilities that retrieve data objects from a service, "execute" capabilities that initiate service-definable operations, and "status" capabilities that check the progress of an order operation.

The "order" capability can include a getVariableByCollection_Operation_TimeRange_SpatialExtent_VerticalExtent method that performs a maximum operation that determines the maximum value of a climate variable according to user-specified input parameters, a minimum operation that determines the minimum value of a climate variable according to user-specified input parameters, a sum operation that determines the sum of the values of a climate variable according to user-specified input parameters, a count operation that determines the number of instances of a climate variable according to user-specified input parameters, an average operation that determines the arithmetic mean of a set of climate variables according to user-specified input parameters, a variance operation that determines the variance of the mean for a set of climate variables according to user-specified input parameters, a difference operation that determines the difference between two climate variables according to user-specified input parameters, and other operations as well. Input parameters can include one or more pieces of data, such as a variable list of specific MERRA climate variables of interest, a name of a target MERRA collection, an operation to perform, a start date for a time span to process over, an end date for a time span to process over, a minimum longitude in degrees east for a horizontal spatial bounding box lower left corner, a minimum latitude in degrees north for a horizontal spatial bounding box lower-left corner, a maximum longitude in degrees east for a horizontal spatial bounding box upper right corner, a maximum latitude in degrees north for a horizontal spatial bounding box upper right corner, a start level for a vertical spatial extent, an end level for a vertical spatial extent, an optional seasonal time span specification, and an optional user-supplied job name. Other variables not listed herein can also be included, and can be dependent on the type of query or content of the query. The variables can be automatically identified or user-specified. The services library can determine various acceptable ranges for these variables when present.

The system includes a utilities library of a plurality of software applications that can process the flat serialized block compressed sequence files (310). Several example software applications that can be included in the utilities library are provided herein. One example software application is a sorting application that sorts <key, value> pairs of the sequence files by time and grouped by a main variable field. Other example software applications can include a comparing application that compares variable name and associated timestamps of the <key, value> pairs, and sorts operations over the <key, value> pairs by comparing variable name and grouping variables by variable name, a partitioning application that partitions results from a mapper based on a variable name across a plurality of reducer applications, enabling parallel execution of the reducer applications, a simplifying application that simplifies sequencing and desequencing operations by abstracting operations on the <key, value> pairs from a main code of a MapReduce software application, and a managing application that manages configuration files required to execute MapReduce software applications.

The system can operate the service over a set of disparate MERRA data collections (312). One source of such data collections is the Goddard Earth Observing System Data Assimilation System Version 5 (GEOS-5). The data collections can reflect various stages of a data gathering, such as a MERRA Data Assimilation System six-hour, three-dimensional analyzed state on pressure collection, a MERRA Incremental Analysis Update, three-hour, three-dimensional assimilated state on pressure collection, and a MERRA Incremental Analysis Update, two-dimensional land surface diagnostics collection.

The system provides a service interface through which a client device can access the climate data via the data analytics platform (314). The service interface can include an adapter module that maps service requests from external client software applications to specific capabilities of the data analytics service, and a representational state transfer (REST) server module that communicatively links the data analytics service to external client software applications. The adapter module can be based on International Organization for Standardization (ISO) Open Archival Information System (OAIS) Reference Model categories. The REST server module can communicate with the external client software applications through ISO OAIS Reference Model-based uniform resource locators including an ingest endpoint of a general form a query endpoint of a general form, an order endpoint of a general form, a download endpoint of a general form, an execute endpoint of a general form, and a status endpoint of a general form. The interface capabilities can be implemented as a PHP program, for example.

The system can further provide a mapper module that compares sequence file <key, value> pairs to input selection criteria and passes climate variable values to a reducer module to perform a specified operation. In this case, the reducer module can receive as input <key, value> pair from the mapper module, perform the specified operation on input climate variable values, and write results to a sequence file. The mapper module can also map inputs to a primary node of the data analytics platform into smaller sub-problems, distribute the smaller sub-problems to secondary nodes, process the smaller sub-problems on the secondary nodes such that the smaller sub-problems are processed in parallel, and collect results of the smaller sub-problems into dynamically created data objects that represent reduced final results.

Various embodiments of the disclosure are described in detail below. While specific implementations are described, it should be understood that this is done for illustration purposes only. Other components and configurations may be used without parting from the spirit and scope of the disclosure.

Figure 4:
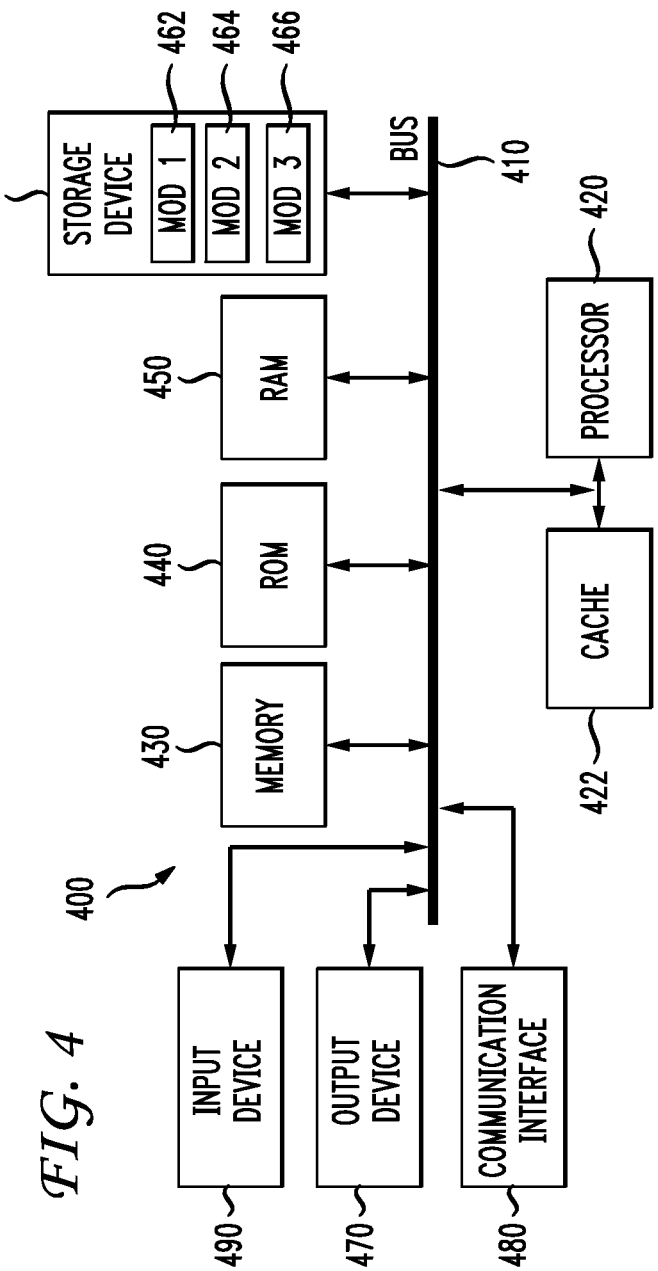
FIG. 4 illustrates an example system embodiment.

A brief description of a basic general purpose system or computing device in FIG. 4 which can be employed to practice the concepts, methods, and techniques disclosed is illustrated. A more detailed description of unsupervised text normalization, as well as embodiments and variations will then follow. These variations shall be described herein as the various embodiments are set forth. The disclosure now turns to FIG. 4.

With reference to FIG. 4, an exemplary system and/or computing device 400 includes a processing unit (CPU or processor) 420 and a system bus 410 that couples various system components including the system memory 430 such as read only memory (ROM) 440 and random access memory (RAM) 450 to the processor 420. The system 400 can include a cache 422 of high-speed memory connected directly with, in close proximity to, or integrated as part of the processor 420. The system 400 copies data from the memory 430 and/or the storage device 460 to the cache 422 for quick access by the processor 420. In this way, the cache provides a performance boost that avoids processor 420 delays while waiting for data. These and other modules can control or be configured to control the processor 420 to perform various operations or actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the processor. The processor 420 may be a self-contained computing system, containing multiple cores or processors, a bus, memory controller, cache, etc. A multi-core processor may be symmetric or asymmetric. The processor 420 can include multiple processors, such as a system having multiple, physically separate processors in different sockets, or a system having multiple processor cores on a single physical chip. Similarly, the processor 420 can include multiple distributed processors located in multiple separate computing devices, but working together such as via a communications network. Multiple processors or processor cores can share resources such as memory 430 or the cache 422, or can operate using independent resources. The processor 420 can include one or more of a state machine, an application specific integrated circuit (ASIC), or a programmable gate array (PGA) including a field PGA.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like.

The storage device 460 can include software modules 462, 464, 466 for controlling the processor 420. The system 400 can include other hardware or software modules. The storage device 460 is connected to the system bus 410 by a drive interface. The drives and the associated computer-readable storage devices provide nonvolatile storage of computer-readable instructions, data structures, program modules and other data for the computing device 400. In one aspect, a hardware module that performs a particular function includes the software component stored in a tangible computer-readable storage device in connection with the necessary hardware components, such as the processor 420, bus 410, display 470, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 400 is a small, handheld computing device, a desktop computer, or a computer server. When the processor 420 executes instructions to perform "operations", the processor 420 can perform the operations directly and/or facilitate, direct, or cooperate with another device or component to perform the operations.

Although the exemplary embodiment(s) described herein employs the hard disk 460, other types of computer-readable storage devices which can store data that are accessible by a computer, such as magnetic cassettes, flash memory cards, digital versatile disks (DVDs), cartridges, random access memories (RAMs) 450, read only memory (ROM) 440, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 420. The functions these blocks represent may be provided through the use of either shared or dedicated hardware, including, but not limited to, hardware capable of executing software and hardware, such as a processor 420, that is purpose-built to operate as an equivalent to software executing on a general purpose processor. For example the functions of one or more processors presented in FIG. 4 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 440 for storing software performing the operations described below, and random access memory (RAM) 450 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 400 shown in FIG. 4 can practice all or part of the recited methods, can be a part of the recited systems, and/or can operate according to instructions in the recited tangible computer-readable storage devices. Such logical operations can be implemented as modules configured to control the processor 420 to perform particular functions according to the programming of the module. For example, FIG. 4 illustrates three modules Mod1 462, Mod2 464 and Mod3 466 which are modules configured to control the processor 420. These modules may be stored on the storage device 460 and loaded into RAM 450 or memory 430 at runtime or may be stored in other computer-readable memory locations.

One or more parts of the example computing device 400, up to and including the entire computing device 400, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 420 can include all types of processors disclosed herein, including a virtual processor. However, when referring to a virtual processor, the processor 420 includes the software components associated with executing the virtual processor in a virtualization layer and underlying hardware necessary to execute the virtualization layer. The system 400 can include a physical or virtual processor 420 that receive instructions stored in a computer-readable storage device, which cause the processor 420 to perform certain operations. When referring to a virtual processor 420, the system also includes the underlying physical hardware executing the virtual processor 420.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply generally to any large, standardized data set. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system comprising:
a data analytics platform comprising an assemblage of compute and storage nodes that provide a compute-storage fabric upon which high-performance parallel operations are performed over a collection of climate data stored in a distributed file system;
a hardware sequencer that transforms the climate data encoded in a native model output file format to yield flat serialized block compressed sequence files and loads the flat serialized block compressed sequence files into the distributed file system by a calling application requesting by an order service request to said data analytics platform via a system interface through which a client device can access the climate data via the data analytics platform indicating operation to be performed and specific predetermined parameters that further specify the order service request, wherein the service interface maps the incoming service request to a first order module, which launches an operation as a MapReduce computation on the data analytic platform and returns a session identifier (ID) through the interface to the calling application; wherein once the order request is launched, the calling application issues status service requests wherein the session ID monitors progress of the order request and the system interface maps a status request to the appropriate call to a services library and receives a status update, which the system interface passes back to the calling application;
a hardware desequencer that transforms the flat serialized block compressed sequence files from the native model output file format to a second climate data file format and moves data stored in the second climate data file format out of the distributed file system and is prepared for retrieval by the calling application as a separate file where the calling application submits a download service request via the system interface mapped to the services library;
a services library comprising a plurality of software applications that dynamically create data objects from the data stored in the second climate data file format as reduced final results; and
a utilities library comprising a plurality of software applications that can process the flat serialized block compressed sequence files whereby the services library returns the data which the system interface relays to the calling application and the calling application sends climate data via the analytics platform through a client device to an end user;
whereby the compute and storage nodes comprise a processor configured as containing multiple cores or processors, a bus, memory controller, cache, including multiple distributed processors located in multiple separate computing devices working together via a communications network sharing resources such as memory and the cache or operating using independent resources configured from of an application specific integrated circuit (ASIC), or a programmable gate array (PGA) including a field PGA utilizing a system bus selected from one of several types of bus structures including a memory bus or memory controller, a peripheral bus, and a local bus connected to storage devices such as a hard disk drive, a magnetic disk drive, an optical disk drive, tape drive, solid-state drive, RAM drive, removable storage devices, and a redundant array of inexpensive disks (RAID), hybrid storage device.

2. The system of claim 1, wherein the parallel operations comprise MapReduce operations, wherein the distributed file system comprises a Hadoop file system, and wherein the climate data comprises Modern-Era Retrospective Analysis for Research and Applications (MERRA) climate data.

3. The system of claim 2, wherein the sequencer transforms native model output file format files to yield sequence files as Hadoop input files.

4. The system of claim 3, wherein the input files are in at least one of Bloom, Sequence, and Map formats.

5. The system of claim 2, wherein the sequencer partitions native MERRA data files by time such that each record in a sequence file contains a timestamp and a MERRA climate variable name which are a composite key of a MapReduce key value pair, and wherein the MERRA climate variable name functions as a value of the key value pair.

6. The system of claim 5, wherein the MERRA climate variable name comprises one to three spatial dimensions.

7. The system of claim 1, wherein the sequencer performs operations further comprising:
reading and writing sequence files;
dynamically determining a file format for the sequence files at run time;
providing access to a main climate variable, associated ancillary variables, and associated metadata contained in sequence files;
storing additional metadata for the main climate variable in sequence files; and
parsing command line arguments and configuration file settings to control the sequencer.

8. The system of claim 1, wherein the climate data is encoded in one of Network Common Data Format or Hierarchical Data Format.

9. The system of claim 1, wherein the sequence files are encoded in one of Bloom, Sequence, or Map file formats.

10. The system of claim 2, wherein the utilities library further comprises:
a sorting application that sorts key value pairs of the sequence files by time and grouped by a main variable field;
a comparing application that compares variable name and associated timestamps of the key value pairs, and sorts operations over the <key, value> pairs by comparing variable name and grouping variables by variable name;
a partitioning application that partitions results from a mapper based on a variable name across a plurality of reducer applications, enabling parallel execution of the reducer applications;
a simplifying application that simplifies sequencing and desequencing operations by abstracting operations on the key value pairs from a main code of a MapReduce software application; and
a managing application that manages configuration files required to execute MapReduce software applications.

11. The system of claim 1, wherein the services library comprises operations corresponding to the International Standards Organization Open Archival Information System Reference Model data flow categories for an operational archive, the operations comprising:
ingest operations to input data objects to the system;
query operations that retrieve metadata relating to data objects in the system;
order operations that dynamically create data objects in the system;
download operations that retrieve data objects from a system;
execute operations that initiate service-definable operations; and
status operations that check on the progress of order operations.

12. The system of claim 1, wherein the services library provides an order operation that comprises a GetVariableByCollection_Operation_TimeRange_SpatialExtent_VerticalExtent method that performs operations comprising:
a maximum operation that determines the maximum value of a climate variable according to user-specified input parameters;
a minimum operation that determines the minimum value of a climate variable according to user-specified input parameters;
a sum operation that determines the sum of the values of a climate variable according to user-specified input parameters;
a count operation that determines the number of instances of a climate variable according to user-specified input parameters;
an average operation that determines the arithmetic mean of a set of climate variables according to user-specified input parameters;
a variance operation that determines the variance of the mean for a set of a climate variables according to user-specified input parameters; and
a difference operation that determines the difference between two climate variables according to user-specified input parameters.

13. The system of claim 12, wherein the order operation returns output comprising a unique session identifier for the order session.

14. The system of claim 12, further comprising: a mapper module that compares sequence file key value pairs to input selection criteria and passes climate variable values to a reducer module to perform a specified operation; and the reducer module that receives as input key value pair from the mapper module and performs the specified operation on input climate variable values, then writes results to a sequence file.

15. The system of claim 14, wherein the mapper module performs operations comprising:
mapping inputs to a primary node of the data analytics platform into smaller sub-problems;
distributing the smaller sub-problems to secondary nodes;
processing the smaller sub-problems on the secondary nodes such that the smaller sub-problems are processed in parallel; and
collecting results of the smaller sub-problems into dynamically created data objects comprising reduced final results.

16. The system of claim 1, wherein the services library provides a status operation that comprises a CheckStatus method that checks on progress of an order request according to user-specified input parameters comprising a unique session identifier for the target order request.

17. The system of claim 16, wherein the status operation returns outputs comprising a unique session identifier for the status session, a one word status update of the session identified by the input session identifier, and a detailed description of a target session.

18. The system of claim 1, wherein the services library provides a download operation that comprises a Get method to download a data object that has been dynamically created by an order request according to user-specified input parameters comprising a unique session identifier for a target order request and an optional name for a resulting data object.

19. The system of claim 18, wherein the output comprises the resulting data object.

20. The system of claim 1, having an interface comprising:
an adapter module that maps service requests from external client software applications to specific capabilities of the data analytics service; and
a representational state transfer server module that communicatively links the data analytics service to external client software applications.

* * * * *